US008192784B2

(12) United States Patent
Anand et al.

(10) Patent No.: US 8,192,784 B2
(45) Date of Patent: Jun. 5, 2012

(54) FRUIT AND VEGETABLE SNACKS

(75) Inventors: Ashish Anand, Plano, TX (US); Brian Peter Jacoby, Dallas, TX (US); Dimitris Lykomitros, Athens (GR); Vamshidhar Puppala, McKinney, TX (US); V. N. Mohan Rao, Plano, TX (US)

(73) Assignee: Frito-Lay North America, Inc., Plano, TX (US)

(*) Notice: Subject to any disclaimer, the term of this patent is extended or adjusted under 35 U.S.C. 154(b) by 427 days.

(21) Appl. No.: 12/253,409

(22) Filed: Oct. 17, 2008

(65) Prior Publication Data
US 2010/0098829 A1 Apr. 22, 2010

(51) Int. Cl.
*A23K 1/00* (2006.01)
*A21D 13/00* (2006.01)
(52) U.S. Cl. .................................... 426/615; 426/94
(58) Field of Classification Search ............... 426/94, 426/549, 808, 615
See application file for complete search history.

(56) References Cited

U.S. PATENT DOCUMENTS
4,495,798 A 1/1985 Ehrgott
4,748,026 A 5/1988 Keefer et al.
2004/0234664 A1 11/2004 Mikota et al.
2005/0266137 A1* 12/2005 Eppler et al. ............ 426/573
2006/0275879 A1* 12/2006 Lynglev et al. ............ 435/135
2007/0207187 A1 9/2007 Yajima et al.
2009/0208607 A1* 8/2009 Bunke et al. ............ 426/87

OTHER PUBLICATIONS

NPL "Vacuum Drying" retrieved on Apr. 29, 2011.*
Barbara's Bakery, Fruit and Yogurt Bars—Blueberry Apple Bar [online], World Pantry, 2007, http://web.archive.org/web/20070125170246/www.worldpantry.com/cgi-bin/ncommerce3/, printed Dec. 3, 2009.
Barbara's Bakery, Fruit and Yogurt Bars—Blueberry Apple Bar—Ingredient List and Nutrition Facts [online], World Pantry, 2007, http://web.archieve.org/web/20070125170246/www.worldpantry.com/cgi-bin/ncommerce3/, printed Dec. 3, 2009.
Fruit Leathers—Fun and Easy [online], Mar. 2008, http://web.archive.org/web/20080331105138/http://www.sunnimaravillosa.com/pood/fruitleather.html, printed Dec. 4, 2009.

* cited by examiner

*Primary Examiner* — Humera Sheikh
*Assistant Examiner* — Bhaskar Mukhopadhyay
(74) *Attorney, Agent, or Firm* — Colin P. Cahoon; Celina M. Orr; Carstens & Cahoon, LLP

(57) ABSTRACT

The present invention discloses formulations for vacuum baked fruit and vegetable snack pieces that have a crispy, crunchy texture similar to potato chip, corn based wafers, and other popular snack items. A fruit or vegetable base is combined with other ingredients and water to make a slurry, which is sheeted and dried in a vacuum belt dryer, and separated into snack sized pieces. In one embodiment, substantial amounts of solid inclusions are combined with the slurry before drying.

11 Claims, 1 Drawing Sheet

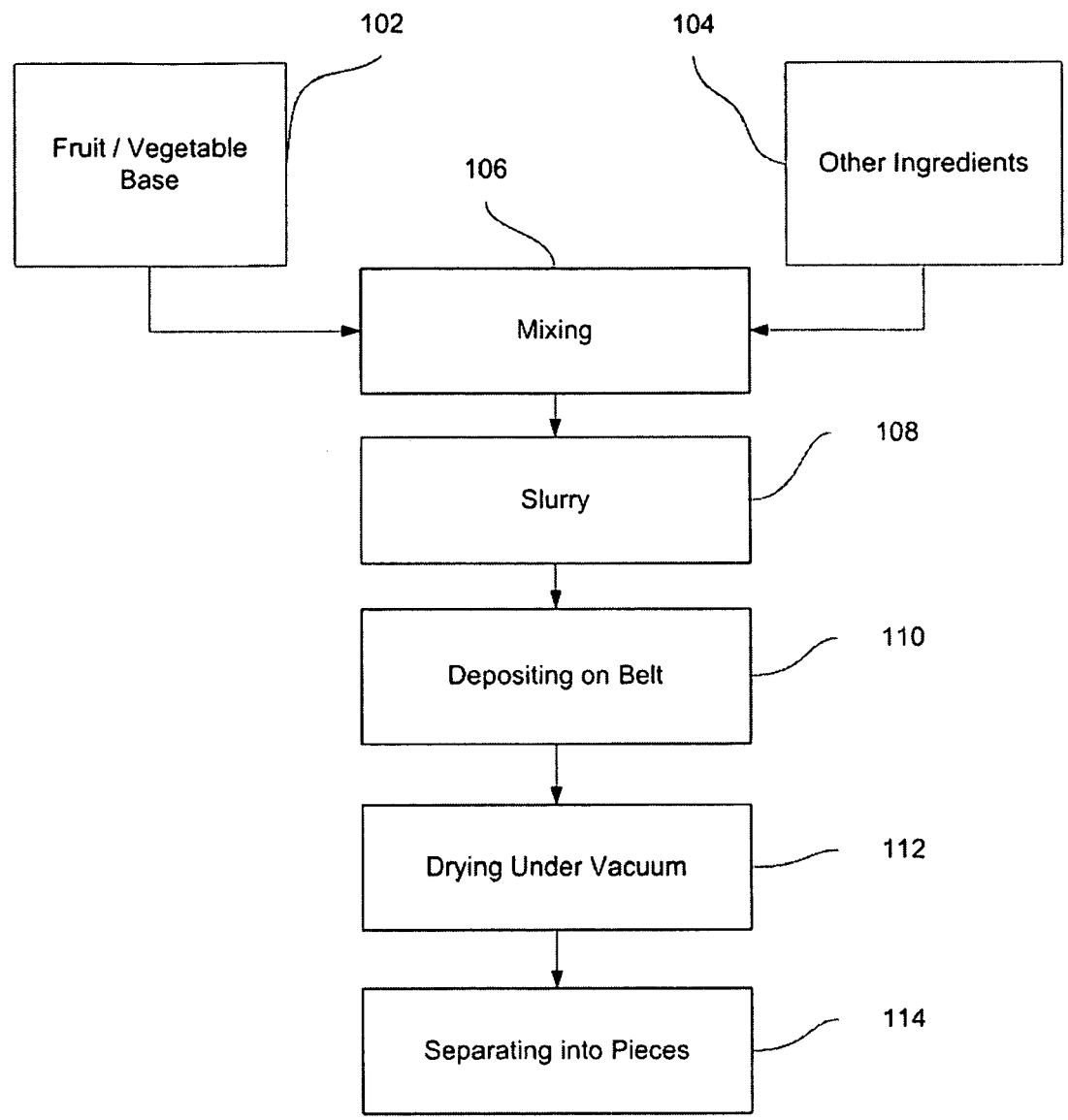

FRUIT AND VEGETABLE SNACKS

BACKGROUND OF THE INVENTION

1. Technical Field

The present invention relates to a method for making an improved snack food and more particularly to a method for making a vacuum baked fruit and/or vegetable based snack food piece.

2. Description of Related Art

Snack pieces such as potato chips and corn based snack chips and wafers are popular consumer items for which there exists a great demand. Potato chips have a crispy texture and can be prepared by cooking slices of whole potatoes. Snack chips can also be created by using potato flakes or corn masa, water and other ingredients to create a starchy dough. The dough is sheeted, cut into pieces of a desired shape, and cooked. The dough is compressed between a pair of counter rotating rollers that are located closely together, thereby providing a pinch point through which the dough is formed into sheets and cut into a desired shape. After the dough is cut into pieces, the pieces are transported towards and through an oven or fryer, which cooks the pieces. The snack pieces are then sent to be packaged. Other types of snack foods, such as corn based wafers, are sometimes thicker and less dense than potato chips, but still have a crispy texture.

Although prior snack chips and wafers are popular and healthy snack items, offering snack pieces that incorporate alternative vegetables and fruits could provide consumers with nutritional benefits that are different from those provided by potatoes and corn. Fruits and non-potato vegetables are generally good sources of vitamins, minerals and other healthy compounds such as anti-oxidants. Different fruits and vegetables are rich in different nutrients, and the United States Department of Agriculture (USDA) recommends consumption of between 5 and 13 servings of a variety of fruit and vegetables per day, depending on the specific individual's needs. According to the Food and Drug Administration, a diet that is high in fiber can reduce a person's risk of certain cancers, diabetes, digestive disorders, and heart diseases, as well as aid weight management. Furthermore, vitamins and minerals are widely recognized as part of a healthy diet, and antioxidants may reduce the risk of heart disease and cancer. Therefore, offering consumers snack items that incorporate fruits and vegetables other than potatoes will be an improvement in the art because consumers will be able to choose from a variety of different snack foods that offer nutritional benefits that differ from those offered by traditional potato chips and corn based snack chips and wafers.

However, prior all fruit and vegetable snack foods generally take the form of dehydrated slices of whole fruits or vegetables. These prior art dehydrated slices are typically chewy and tough, and do not have the crispy, crunchy texture desired by consumers for snack items. Furthermore, it has proven difficult in the prior art to provide fabricated snack products that are not nutritionally different from traditional potato chips and corn-based snack wafers. Consequently, the need exists for a fruit or vegetable based snack piece with a crispy, crunchy texture.

SUMMARY OF THE INVENTION

The present invention provides a great tasting, healthy snack piece having a high content of fruit or vegetable solids, and a crispy, crunchy texture similar to snack chips, snack wafers, and other snack items desired by consumers. In one embodiment, the snack piece of the present invention preferably has at least ½ serving of vegetables or fruit per 1 ounce serving of snack pieces. In another embodiment, the snack piece of the present invention has at least 1 serving of vegetables or fruit per 1 ounce serving of snack pieces.

In one aspect of the invention, a blend of fruit puree concentrates and/or fruit powders is used as a healthy ingredient in vacuum baked snack pieces. In another aspect of the invention, a blend of vegetable puree concentrates and/or vegetable powders is used as a healthy ingredient in vacuum baked snack pieces. In either case, the snack pieces have a desirable crispy, crunchy texture and retain a high percentage of health benefits and flavors from the original ingredients due to the low temperatures used during cooking. These as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a flowchart indicating the processing steps for one embodiment of the present invention.

DETAILED DESCRIPTION

The snack pieces of the present invention are high in vegetable or fruit content. The nutritional goals for the snack chips of the present invention include, per 1 ounce serving of snack pieces: no more than 5 g of fat, 1 gram or less of saturated fat, zero trans-fatty acids, and no more than 240 milligrams of sodium. As used herein, the term fruit is used in the culinary sense and includes those botanical fruits that are sweet and fleshy. Examples of fruit include, without limitation, apple, strawberry, blueberry, cranberry, plum, peach, mango, banana, pear, grape and orange. The term vegetable is used herein in the culinary sense and includes those plant fruits that are savory, as opposed to sweet. Examples of vegetables include, without limitation, pumpkin, tomato, carrot, onion, bell pepper, beet, cucumber, broccoli and squash.

In one preferred embodiment, the snack pieces of the present invention incorporate at least ½ serving of fruits or vegetables per 1 ounce serving of the snack pieces. In another preferred embodiment, the snack pieces of the present invention incorporate at least 1 serving of fruits or vegetables per 1 ounce serving of the snack pieces.

The United States Department of Agriculture (USDA) defines a serving of fruit or vegetables as ½ cup of chopped fruit or vegetables, respectively. For example, ½ cup of chopped raw apples constitutes 1 serving of apples, and ½ cup of chopped or sliced raw tomatoes constitutes 1 serving of tomato under the USDA guidelines. A serving of fruit or vegetables can be understood as having a moisture content and a solids content. Vegetable solids and fruit solids are defined herein as the non-water components of vegetables and fruits, respectively. Thus, a serving of vegetables comprises a vegetable solids content on a dry basis and a serving of fruit comprises a fruit solids content on a dry basis. The USDA National Nutrient Database for Standard Reference defines the weight of the edible portion of a fruit or vegetable in that ½ cup and defines the average moisture and thus the fruit solids or vegetable solids content of the edible portion of a fruit or vegetable. Table 1, for example, depicts the nutrient profile for 1-cup or 125 grams of raw apples as accessed at http://www.nal.usda.gov/fnic/foodcomp/search/.

TABLE 1

Raw Apples

| Nutrient Proximates | Units | 1.00 × 1 cup, chopped or sliced 125 g |
|---|---|---|
| Water | g | 106.95 |
| Energy | kcal | 65 |
| Energy | kj | 272 |
| Protein | g | 0.33 |
| Total lipid (fat) | g | 0.21 |
| Ash | g | 0.24 |
| Carbohydrate, by difference | g | 17.26 |
| Fiber, total dietary | g | 3.0 |
| Sugars, total | g | 12.99 |
| Sucrose | g | 2.59 |
| Glucose (dextrose) | g | 3.04 |
| Fructose | g | 7.38 |
| Lactose | g | 0.00 |
| Maltose | g | 0.00 |
| Galactose | g | 0.00 |
| Starch | g | 0.06 |

USDA National Nutrient Database for Standard Reference. Release 20 (2007)

As used herein, a serving of fruit or a serving of vegetables is defined as the amount of fruit solids or vegetable solids content that is equivalent to ½ cup (118 cubic centimeters) of chopped fruit or vegetables on a dry basis based on the USDA National Nutrient Database for Standard Reference, Release 20, 2007, which is incorporated herein by reference. According to Table 1, one cup of chopped or quartered raw apples weighs 125 grams, has a water content of 85.56% by weight and a fruit solids content of 14.44%. One fruit serving of raw apples (½ cup) has a total weight of 62.5 grams. Consequently, 9.025 grams (14.44% solids content×62.5 grams total weight) of apple solids in a finished product is equivalent to one serving of fruit. Thus, a snack piece having a one-half fruit serving would have approximately 4.51 grams of apple solids in a 1 ounce serving of snack pieces, and a snack piece having one fruit serving would have approximately 9.025 grams of apple solids in a 1 ounce serving of snack pieces.

Consequently, in one embodiment, vegetable or fruit ingredients can be used in accordance with the present invention in an amount sufficient to provide for a one-half fruit or vegetable serving, and in another preferred embodiment in an amount sufficient to provide for one fruit or vegetable serving. As used herein, one serving of fruit or one serving of vegetables is defined as the amount of fruit or vegetable solids that is equivalent to ½ cup (118 cubic centimeters) of a chopped fruit or vegetables on a dry basis based on the USDA National Nutrient Database for Standard Reference, Release 20, 2007, which is incorporated herein by reference.

In one embodiment of the present invention, fruit puree concentrate is used as an ingredient in a slurry that is capable of being deposited onto a belt in the form of a sheet, cooked under vacuum conditions and cut into snack pieces. Fruit puree concentrate, as used herein, is a fruit puree that has a portion of water removed, so that the solids content of the fruit is concentrated. In another embodiment, vegetable puree concentrate is used as an ingredient in a slurry that is spread into a sheet, cooked under vacuum, and cut into snack pieces. Fruit puree concentrate and vegetable puree concentrate typically comprise between about 25% and about 75% fruit or vegetable solids by weight, depending on the fruit or vegetable used. In a preferred embodiment, the fruit puree concentrate or vegetable puree concentrate comprises between about 30% and about 60% moisture by weight. In still another embodiment, fruit or vegetable powder can be used as an ingredient in the slurry. As used herein, the term "fruit base" refers to fruit puree concentrate, fruit powder or mixtures thereof. As used herein, the term "vegetable base" refers to vegetable puree concentrate, vegetable powder or mixtures thereof.

FIG. 1 depicts a flowchart for one embodiment of the method of the present invention. The fruit and vegetable bases 102 can be mixed 106 with one or a combination of other ingredients 104 including yogurt powders, whey protein powders, flours and water to manipulate the viscosity or Bostwick value of the slurry 108, and optimize the flavor, texture and nutritional content of the resulting snack pieces. Including whey protein powder in the slurry mixture causes the slurry to foam as it dries under vacuum conditions, which lightens the texture of the resulting snack piece. Flours, such as whole grain flours and modified flours, increase the viscosity of the slurry sheet and give the resulting snack piece a desirable wholesome, crunchy texture. Whole grain flours can also impart into the snack piece the health benefits of the flours' constituent whole grains.

In one embodiment, the method used to make the snack pieces of the present invention involves spreading or depositing 110 the vegetable or fruit slurry over a conveyor belt and cooking or drying the slurry under vacuum conditions 112. The conveyor belt is a continuously rotating belt that is designed to convey objects placed on it from one end of the belt to the other. Underneath the belt is a heating element that heats any product placed on the belt. In a preferred embodiment, at least two different heating zones are provided. Preferably, the cooking temperature is kept below about 110° C. in order to preserve the natural color, flavor and nutritional qualities of the fruit or vegetable ingredients used in the snack pieces. The fruit and vegetable slurries used with the present invention are heat sensitive. Thus, traditional oven drying does not produce a suitable final product because the sugars present in the slurries easily brown. Additionally, the fruit and vegetable flavors and nutrients easily volatize and escape during heated baking.

In one embodiment, the conveyor belt and heating element are contained inside a vacuum chamber. The pressure inside the vacuum chamber is preferably variable. The pressure levels used in accordance with the method of the present invention range from about 2 Torr to about 60 Torr. Furthermore, the pressure level inside the vacuum chamber is varied throughout the cooking process. In a preferred embodiment, the pressure level at the beginning of the cooking process is higher than the pressure level at the end of the process. Cooking under vacuum conditions allows the slurry sheet to be dried at much lower temperatures than are feasible on a commercial scale under atmospheric conditions, and allows practitioners of the present invention to vary the product formulation and chamber pressure to optimize the product texture and flavor.

In one embodiment, the fruit or vegetable base is first mixed together with water, yogurt powder, and whey protein to form a slurry. In one embodiment, the slurry comprises between about 20% and about 55% fruit or vegetable base (powders, puree concentrates, or mixtures thereof), between about 5% and about 23% yogurt powder, between about 0.5% and about 5% whey protein powder, and between about 5% and about 60% added water. The slurry preferably comprises an overall moisture content between about 25% and about 70%. In another embodiment flour comprises between about 1% and about 50% of the slurry. The flour used in accordance with one embodiment comprises at least one of whole grain flours and modified flours. All percentages used herein are by weight unless otherwise noted. Furthermore, each ingredient comprises a moisture component and a solids component. For example, yogurt powder comprises a moisture component and a yogurt solids component, and the yogurt solids are defined as the non-water components of the yogurt powder.

In another embodiment, the fruit or vegetable slurry is used as a binder and mixed with whole or recognizable solid inclusions. In one embodiment, the solid inclusions comprise nuts or seeds. Examples of nuts include, without limitation, peanut, almond, pistachio, cashew, Brazil nut, pecan, hazelnut and walnut. In a preferred embodiment, the nuts or seeds are fully cooked/roasted prior to being combined with the slurry described above. The vacuum belt dryer will not appreciably cook or roast the nuts during vacuum dehydration, so such steps must occur prior to entry into the vacuum belt dryer. The resulting snack is novel because it combines cooked or roasted nuts with a fruit or vegetable based binder that is extremely heat sensitive, as described above. This novel combination of a roasted component with a heat sensitive component has not been taught or suggested by the prior art. In one embodiment, the slurry comprises between about 20% and about 40% of the total mixture of solid inclusions and slurry. In another embodiment, the solid inclusions comprise between about 60% and about 80% of the total mixture of solid inclusions and slurry. In another embodiment, the solid inclusions comprise recognizable pieces of fruits or vegetables. These solid inclusions are also heat sensitive, which makes them ideal for use in the vacuum belt dryer with the slurries described above.

In one preferred embodiment, the slurry comprises about 20% to about 30% apple puree concentrate, about 20% to about 30% blueberry puree concentrate, about 20% to about 30% whole grain flour, about 10% to about 15% said yogurt powder, about 0.70% to about 1.25% said whey protein powder, about 6% to about 10% said added water, and has a Bostwick viscosity value between about 6.5 centimeters in 30 seconds and about 7.5 centimeters in 30 seconds.

In another preferred embodiment, the slurry comprises about 30% to about 35% apple puree concentrate, about 5% to about 15% blueberry puree concentrate, about 2% to about 3% strawberry powder, about 2% to about 3% banana powder, about 10% to about 20% whole grain flour, about 10% to about 20% said yogurt powder, about 4% to about 6% rice flour, about 0.70% to about 1.25% said whey protein powder, about 15% to about 20% said added water, and has a Bostwick viscosity value between about 6 centimeters in 30 seconds and about 7 centimeters in 30 seconds.

In still another preferred embodiment, the slurry comprises about 10% to about 15% strawberry powder, about 7% to about 13% banana powder, about 7% to about 13% apple puree concentrate, about 7% to about 13% said yogurt powder, about 4% to about 6% rice flour, about 1% to about 1.5% said whey protein powder, about 50% to about 60% said added water, and has a Bostwick viscosity value between about 2 centimeters in 30 seconds and about 3 centimeters in 30 seconds. In another embodiment, the slurry comprises between about 30% and about 50% carrot puree concentrate, about 20% to about 50% whole grain flour, about 1% to about 5% whey protein, about 8% to about 15% yogurt powder, and about 5% to about 15% added water.

In yet another preferred embodiment, the slurry comprises about 14% to about 18% apple concentrate, about 24% to about 28% peach concentrate, about 21% to about 25% whole oat flour, about 20% to about 24% yogurt powder, about 0.5% to about 1.5% whey protein powder, about 10% to about 14% added water, and has a Bostwick viscosity value between about 12 centimeters in 30 seconds and about 13 centimeters in 30 seconds. In another preferred embodiment, the slurry comprises about 11% to about 15% apple concentrate, about 11% to about 15% banana concentrate, about 16% to about 20% strawberry concentrate, about 21% to about 25% whole oat flour, about 20% to about 24% yogurt powder, about 0.5% to about 1% whey protein powder, about 10% to about 14% added water, and has a Bostwick viscosity value between about 12 centimeters in 30 seconds and about 13 centimeters in 30 seconds. In still another preferred embodiment, the slurry comprises about 7% to about 11% apple concentrate, about 3% to about 7% banana concentrate, about 4% to about 8% strawberry concentrate, about 40% to about 44% whole oat flour, about 3% to about 7% yogurt powder, about 0.5% to about 1.5% whey protein powder, about 3% to about 7% rice flour, and about 25% to about 29% added water.

The slurry created in accordance with the present invention must have a consistency sufficient to allow it to remain on the conveyor belt without dripping or running off the sides of the belt as it dries. However, it should also be fluid enough to settle into a sheet of approximate uniform thickness once it is deposited onto the belt. Therefore, in a preferred embodiment, the Bostwick viscosity for the vegetable or fruit slurry is between about 2 centimeters in 30 seconds and about 13 centimeters in 30 seconds when measured at 75° F. Such a slurry can be pumped into the vacuum chamber and deposited onto the conveyor belt to form a reasonably uniform sheet, but will not drip off the sides of the belt, even when the belt has sidewalls. The sheet thickness depends largely on the Bostwick viscosity and the rate at which the slurry is deposited onto the belt. In one embodiment, the sheet thickness ranges between about 0.5 millimeters and about 10 millimeters. The slurry is preferably deposited onto the belt 112 through a nozzle that moves laterally across the belt as the belt turns.

Before, during or after the deposition of the slurry sheet on the belt, the pressure level inside the vacuum chamber is reduced to between about 5 Torr and about 60 Torr, and the temperature of the heating element under the belt is fixed between about 75° C. and about 110° C. As the moisture content of the slurry sheet is reduced, the pressure inside the chamber is reduced. In one embodiment, when the moisture content of the slurry sheet has been reduced to a final level between about 1% and about 2%, the pressure level inside the vacuum chamber is between about 2 Torr and about 6 Torr.

Next, the dried slurry sheet is optionally allowed to cool and harden on the belt before it is separated into individual pieces 114. During the cooling phase, the temperature of the heating element under the belt is reduced to between about 20° C. and about 40° C. The cooled, dried sheet is then fractured, or broken up into snack sized pieces, which can be accomplished by impacting the dried sheet with a guillotine-like blade at predetermined intervals to fracture the sheet into pieces, or by cutting the sheet into desired pieces. Alternatively, the slurry sheet can be cut into individual snack pieces as it is drying, but after the slurry sheet has been dried to a moisture level and consistency that allows the sheet to be cut into individual snack sized pieces that do not expand, resettle, and reform a continuous sheet after the pieces are cut.

In one embodiment, the snack piece of the present invention comprises about 13% to about 67% fruit solids or vegetable solids, about 14% to about 28% yogurt solids, about 1% to about 6% whey protein solids, and about 1% to about 2% water. In another embodiment, the snack piece of the present invention further comprises about 2% to about 60% flour solids. In one embodiment, the composition of the fruit solids in the snack of the present invention comprises about 40% to about 60% apple solids, and about 40% to about 60% blueberry solids. In another embodiment, the composition of the fruit solids in the present invention comprises about 6% to about 16% banana solids, about 6% to about 16% strawberry solids, about 50% to about 70% apple solids, and about 16% to about 20% blueberry solids. In another embodiment, the composition of the fruit solids of the present invention comprises about 40% to about 50% strawberry solids, about 30% to about 40% banana solids, and about 10% to about 30% apple solids. In still another embodiment of the present invention, the vegetable solids comprise about 100% carrot solids.

EXAMPLE 1

A first ingredient mixture comprising, by weight, about 25.81% apple puree concentrate, about 25.81% blueberry puree concentrate, about 24.81% whole oat flour, about 13.90% yogurt powder, about 0.99% whey protein, and about 8.68% added water was mixed in a Hobart mixer until a relatively homogenous slurry was formed. The Bostwick viscosity value for the first slurry was approximately 7.0 centimeters in 30 seconds.

The slurry was dried using a Bucher DryBand vacuum belt dryer. A feed pump was used to pump the slurry through a nozzle and deposit the slurry onto a rotating belt. The slurry settled on the belt into a sheet about 5 millimeters to about 10 millimeters thick. The pressure level inside the chamber was initially 13.5 Torr and the temperature of the heating element underneath the belt was approximately 100° C.

At approximately 18 minutes into the process, the pressure level inside the chamber had been raised to 21 Torr. About fifty three minutes after that, the pressure level inside the chamber had been reduced to 7.5 Torr. At this point, the temperature heating element under the belt was reduced to about 40° C., and the sheet was allowed to cool for approximately 23 minutes. While the sheet was cooling, the vacuum level inside the chamber was further reduced to 6.0 Torr. The moisture content of the dried sheet was between about 1.5% and about 2% by weight, and it was broken into snack sized pieces after it was removed from the vacuum chamber. The total dwell time of the first sheet inside the vacuum chamber was approximately 94 minutes.

EXAMPLE 2

A second ingredient mixture comprising, by weight, about 33.33% apple puree concentrate, about 9.52% blueberry puree concentrate, about 14.29% whole oat flour, about 2.38% strawberry powder, about 2.38% banana powder, about 4.76% rice flour, about 15.24% yogurt powder, about 0.95% whey protein, and about 17.14% added water was mixed in a Hobart mixer until a relatively homogenous slurry formed. The Bostwick viscosity value for the second slurry was approximately 6.5 centimeters in 30 seconds.

This second slurry was pumped into the Bucher vacuum belt dryer as described in Example 1 above. The slurry settled into a sheet having a thickness between about 5 millimeters and about 10 millimeters. The pressure level inside the chamber was initially set at 21 Torr and the temperature of the heating element under the belt was set at a temperature between about 85° C. and about 100° C.

After the slurry sheet dried inside the chamber for approximately eleven minutes, the pressure level had been raised to 22.5 Torr. Approximately forty four minutes later, the vacuum level had been reduced to 5.25 Torr. At this point, the temperature of the heating element under the belt was reduced to between 30° C. and 40° C., and the sheet was allowed to cool for approximately 23 minutes. While the sheet was cooling, the vacuum level inside the chamber was further reduced to 3 Torr. The moisture content of the dried sheet was between about 1.5% and about 2% by weight, and it was broken into snack sized pieces after it was removed from the vacuum chamber. The total dwell time of the second sheet inside the vacuum chamber was approximately 72 minutes.

EXAMPLE 3

A third ingredient mixture comprising, by weight, about 12.6% strawberry powder, about 10.1% banana powder, about 10.7% apple puree concentrate, about 9.4% yogurt powder, about 1.3% whey protein, and about 56% added water was mixed in a Hobart mixer until a relatively homogenous slurry was formed. The Bostwick viscosity value for the third slurry was about 2.5 centimeters in 30 seconds.

This third slurry was pumped into the Bucher vacuum belt dryer as described in Example 1 above. The slurry settled into a sheet having a thickness between about 5 millimeters and about 10 millimeters. The pressure level inside the chamber was initially set at 13.5 Torr and the temperature of the heating element under the belt was set at a temperature between about 88° C. and about 100° C.

After the slurry sheet dried inside the chamber for approximately five minutes, the pressure level had been raised to 20.25 Torr. Approximately eighty one minutes later, the vacuum level had been reduced to 5.25 Torr. At this point, the temperature heating element under the belt was reduced to between 38° C. and 40° C., and the sheet was allowed to cool for approximately 4 minutes. While the sheet was cooling, the vacuum level inside the chamber remained at 5.25 Torr. The moisture content of the dried sheet was between about 1.5% and about 2% by weight, and it was broken into snack sized pieces after it was removed from the vacuum chamber. The total dwell time of the third sheet inside the vacuum chamber was approximately 90 minutes.

EXAMPLE 4

A fourth ingredient mixture comprising, by weight, about 18.1% strawberry powder, about 12.4% banana powder, about 12.4% apple puree concentrate, about 22.7% whole oat flour, about 21.8% yogurt powder, about 0.8% whey protein, and about 11.8% added water was mixed in a Hobart mixer until a relatively homogenous slurry was formed. The Bostwick viscosity value for the fourth slurry was about 12.75 centimeters in 30 seconds.

This fourth slurry was pumped into the Bucher vacuum belt dryer as described in Example 1 above. The slurry settled into a sheet having a thickness between about 5 millimeters and about 10 millimeters. The pressure level inside the chamber was initially set at about 23 Torr and the temperature of the heating element under the belt was set at a temperature of about 82° C.

After the slurry sheet dried inside the chamber for approximately 83 minutes, the pressure level had dropped to about 6 Torr. At this point, the temperature heating element under the belt was reduced to about 20° C., and the sheet was allowed to cool for between about 10 and about 20 minutes. While the sheet was cooling, the vacuum level inside the chamber remained at about 6 Torr. The moisture content of the dried sheet was between about 1.5% and about 2% by weight, and it was broken into snack sized pieces after it was removed from the vacuum chamber.

EXAMPLE 5

A fifth ingredient mixture comprising, by weight, about 26.4% peach puree concentrate, about 16.5% apple puree concentrate, about 22.7% whole oat flour about 21.8% yogurt powder, about 0.8% whey protein, and about 11.8% added water was mixed in a Hobart mixer until a relatively homogenous slurry was formed. The Bostwick viscosity value for the fifth slurry was about 12.5 centimeters in 30 seconds.

This fifth slurry was pumped into the Bucher vacuum belt dryer as described in Example 1 above. The slurry settled into a sheet having a thickness between about 5 millimeters and about 10 millimeters. The pressure level inside the chamber was initially set at about 23 Torr and the temperature of the heating element under the belt was set at a temperature of about 100° C.

After the slurry sheet dried inside the chamber for approximately 75 minutes, the pressure level had dropped to about 6 Torr. At this point, the temperature heating element under the belt was reduced to about 20° C., and the sheet was allowed to cool for between about 10 and about 20 minutes. While the sheet was cooling, the vacuum level inside the chamber remained at about 6 Torr. The moisture content of the dried sheet was between about 1.5% and about 2% by weight, and it was broken into snack sized pieces after it was removed from the vacuum chamber.

The fruit chips described in the above examples contained at least 1 serving of fruit. They also had a crispy, crunchy texture similar to that of other popular consumer snack items, such as potato crisps and snack wafers. In addition, the fruit and vegetable chips disclosed herein met or exceeded the other preferred nutritional goals. Specifically, the chips disclosed above had, per 1 ounce serving, less than 5 g of fat, 1 gram or less of saturated fat, zero trans-fatty acids, and no more than 240 milligrams of sodium. In sum, the result is a healthy, nutritious snack piece high in vegetable or fruit content and having a crispy texture similar to a potato and corn based snack pieces.

What is claimed is:

1. A method of making a snack piece, said method comprising:
   mixing ingredients together to form a slurry with a Bostwick viscosity value between about 2 centimeters in 30 seconds and about 13 centimeters in 30 seconds when measured at about 75° F., said slurry comprising, by weight:
   about 20% to about 55% fruit base or vegetable base;
   about 5% to about 23% yogurt powder;
   about 0.5% to about 5% whey protein powder; and
   about 5% to about 60% added water;
   depositing said slurry onto a belt inside a vacuum chamber to form a slurry sheet;
   drying said slurry sheet on said belt at a temperature between about 75° C. and about 110° C. and a pressure between about 2 Torr and about 60 Torr until said slurry sheet has a total moisture content between about 1% and about 2% by weight to produce a dried slurry sheet; and
   separating said dried slurry sheet into individual snack pieces.

2. The method of claim 1 wherein said slurry sheet has a thickness between about 0.5 millimeters and about 10 millimeters.

3. The method of claim 1 wherein said fruit base comprises at least one of fruit puree concentrate and fruit powder.

4. The method of claim 1 wherein said vegetable base comprises at least one of vegetable puree concentrate and vegetable powder.

5. The method of claim 1 wherein said slurry further comprises about 1% to about 50% flour.

6. The method of claim 1 further comprising cooling said dried slurry sheet before said separating into individual snack pieces.

7. The method of claim 1 wherein said mixing of said ingredients further comprises mixing solid inclusions with said slurry before said depositing step.

8. The method of claim 7 wherein said solid inclusions comprise at least one of nuts or seeds.

9. The method of claim 7 wherein said solid inclusions comprise at least one of fruit pieces or vegetable pieces.

10. The method of claim 8 wherein said nuts are cooked or roasted.

11. The method of claim 6 wherein said cooling comprises reducing the temperature of a heating element under said belt to between about 20° C. to about 40° C.

\* \* \* \* \*